(No Model.)
A. B. WEBSTER.
WHIFFLETREE AND COUPLING THEREFOR.
No. 581,637. Patented Apr. 27, 1897.
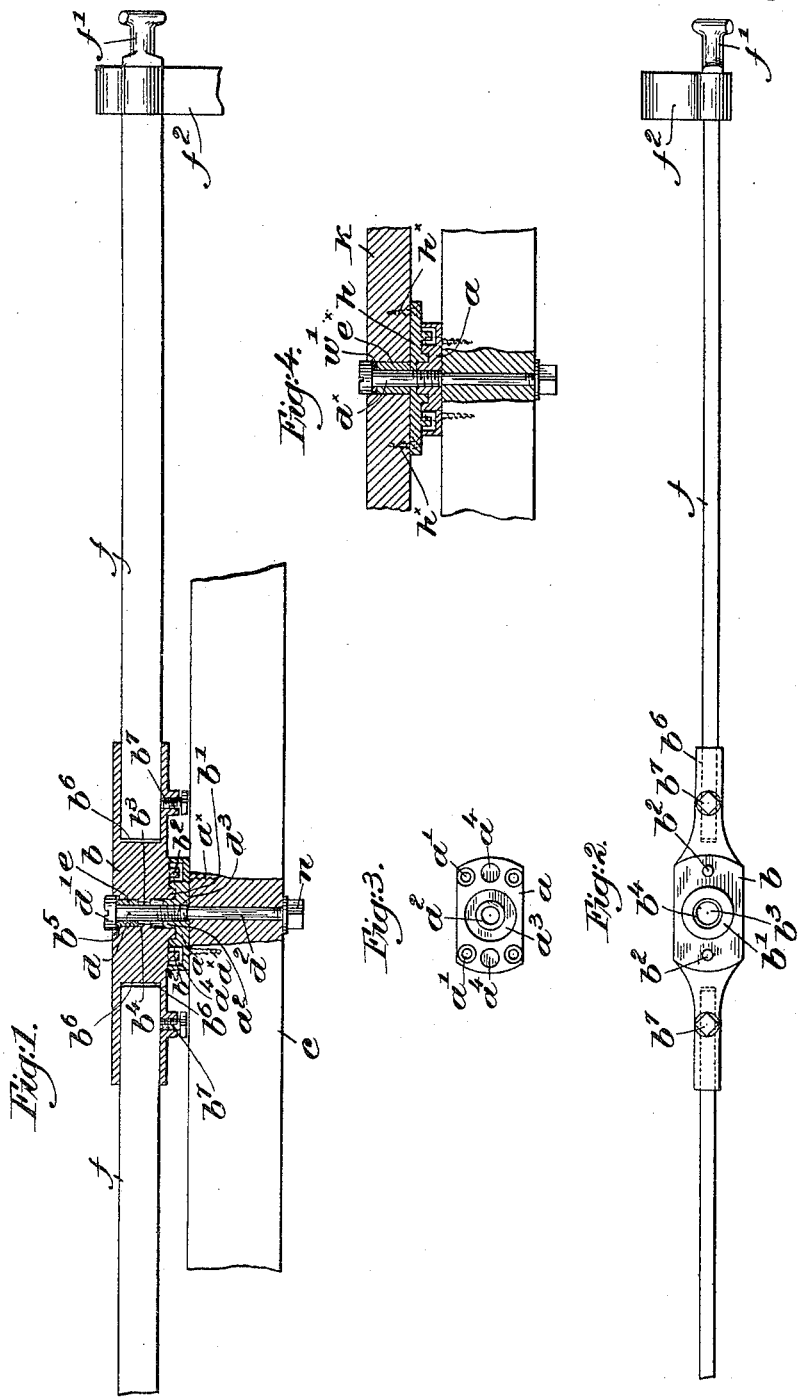
Witnesses.
Fred S. Greenleaf.
Thomas J. Drummond.
Inventor
Albert B. Webster
by Crosby & Gregory, attys.

UNITED STATES PATENT OFFICE.

ALBERT B. WEBSTER, OF MANCHESTER, NEW HAMPSHIRE, ASSIGNOR, BY DIRECT AND MESNE ASSIGNMENTS, TO LEWIS H. JOSSELYN, OF SAME PLACE, AND CHARLES W. ALLEN, OF BOSTON, MASSACHUSETTS.

WHIFFLETREE AND COUPLING THEREFOR.

SPECIFICATION forming part of Letters Patent No. 581,637, dated April 27, 1897.

Application filed December 18, 1894. Renewed March 18, 1897. Serial No. 628,229. (No model.)

*To all whom it may concern:*

Be it known that I, ALBERT B. WEBSTER, of Manchester, county of Hillsborough, State of New Hampshire, have invented an Improvement in Whiffletrees and Couplings Therefor, of which the following description, in connection with the accompanying drawings, is a specification, like letters on the drawings representing like parts.

This invention has for its object the production of a novel whiffletree-coupling and whiffletree strong and simple in construction and readily adjustable to compensate for wear, the whiffletree and coupling forming an elastic draft, while permitting play of the whiffletree due to horse motion.

The particular features in which my invention consists will be hereinafter particularly described, and pointed out in the claims at the end of this specification.

Figure 1, in side elevation and partly in section, represents a whiffletree and coupling embodying my invention. Fig. 2 is an under side view, broken off at one end, of the whiffletree shown in Fig. 1. Fig. 3 is a top view of the base-plate, and Fig. 4 is a sectional view of the coupling applied to an ordinary whiffletree.

I have herein shown the coupling as comprising a fixed member or base-plate $a$ and a movable member $b$, the latter forming the supporting portion of the whiffletree in Figs. 1 and 2. The plate $a$ is attached to the pole or shaft cross-bar $c$ by suitable fastenings, as screws $a^x$, extended through openings $a'$ in the plate, (see Fig. 2,) and a tubular internally-threaded central boss $a^2$ is formed on the upper side of the plate, surrounded by an annular recess or groove $a^3$, while recesses $a^4$ are located at each side of the annular groove $a^3$, for a purpose to be described. The movable or upper member $b$ has on its lower face a central hub $b'$ to enter the groove $a^3$ in the plate $a$, the boss $a^2$ of the latter extending within the hub, as shown fully in Fig. 1, and projections $b^2$ on the upper member $b$ enter the recesses $a^4$ in the plate $a$ to limit the relative movement of the member $b$ about the boss $a^2$. The whiffletree is thus positively limited in its movement, and it is almost impossible for a horse to free himself from the vehicle so long as either trace remains unbroken.

I have shown in Fig. 1 the movable member $b$ as of considerable thickness and having an aperture $b^3$ to receive therethrough a draw-bolt $d$, provided with a head $d'$ and reduced in thickness at $d^2$. The aperture $b^3$ is preferably chambered to receive therein a tube or sleeve $e$, of rubber or similar material, or it might be a spiral spring supported on the shoulder $b^4$ and surrounding the draw-bolt and held in place by the head $d'$ thereof, which head enters a counterbore $b^5$, forming a metallic bearing.

To positively connect the members $a$ and $b$ of the coupling and to take up wear, the bolt $d$ is screw-threaded at $d^3$ to engage the threaded boss $a^2$ of the base-plate, rotation of the bolt, preferably having its head nicked to facilitate adjustment, drawing the two members together as desired.

The reduced portion $d^2$ of the bolt is extended through the cross-bar $c$ and held firmly therein by a nut $n$ on its threaded extremity, so that the bolt not only connects the members of the coupling in an adjustable manner, but it materially assists in rigidly securing the fixed member $a$ to the cross-bar, the movable member $b$ turning about said draw-bolt.

In Figs. 1 and 2 the movable member $b$ is provided with sockets $b^6$ to receive the inner ends of preferably spring-steel arms $f$, held in place by set-screws $b^7$, so that the arms $f$ may be adjusted and removed when desired.

A tug-holder $f'$ is formed on the free end of each arm, and I preferably connect a flexible band or strap $f^2$ to each arm to limit its movement, the other end of the band $f^2$ being usually secured to the cross-bar.

The arms $f$ are rolled tapering toward their outer ends to cause greater uniformity in bending, and it will be evident that the swinging motion of the whiffletree is combined with an elastic draft, relieving the vehicle from sudden shocks and jerks and thereby prolonging its life in addition to making it much more comfortable to ride in.

In Fig. 4 the fixed member $a$ is the same, but the upper member is shown as a plate $h$, attached by screws $h^\times$ to a whiffletree $k$, of usual construction, the draw-bolt $d^\times$ passing through the latter and engaging the threaded boss of the plate $a$. Preferably the whiffletree $k$ is chambered out to receive a rubber sleeve, as $e^\times$, or a spiral spring, and a metallic washer $w'$ is interposed between the whiffletree and the under side of the bolt-head to prevent wear. Further detailed description of Fig. 4 is unnecessary, as its construction will be apparent.

While I have shown and described the coupling as used in connection with a whiffletree, it is obvious that it may be applied with equal facility to a doubletree without departing from the spirit and scope of my invention.

The yielding sleeve, whether it be rubber or similar material or a spiral spring, which surrounds the draw-bolt between its head and the threaded portion, prevents all rattling of the movable member on the bolt or fixed member.

I claim—

1. A whiffletree consisting of a central laterally-socketed member having a chambered axial aperture, counterbored at its upper end, a hub surrounding the lower end of the aperture, and tug-holding arms secured in the sockets, combined with a bearing-plate having a threaded boss on its upper side to enter the hub, a headed draw-bolt extended through said member and plate and threaded into the boss, its head entering the counterbore of the aperture and its projecting end securing the plate to a cross-bar, and a yielding sleeve surrounding the bolt in the chambered portion of the aperture, substantially as described.

2. A whiffletree having a central laterally-socketed supporting member, independent elastic tug-holding arms adjustably secured in said sockets, and means to secure the arms in adjusted position, combined with a fixed bearing-plate upon which the supporting member of the whiffletree is mounted, and an adjustable draw-bolt positively connecting the whiffletree and bearing-plate and threaded to enter the latter, the unthreaded portion of said draw-bolt passing through a cross-bar, and attaching the bearing-plate thereto, substantially as described.

In testimony whereof I have signed my name to this specification in the presence of two subscribing witnesses.

ALBERT B. WEBSTER.

Witnesses:
E. P. CORNISH,
S. M. WINN.